US011016751B2

(12) United States Patent
Keshri et al.

(10) Patent No.: US 11,016,751 B2
(45) Date of Patent: May 25, 2021

(54) AUTOMATIC UPGRADE ON TOTAL RUN COUNT DATA ON AVAILABILITY OF NEW SOFTWARE

(71) Applicant: Otis Elevator Company, Farmington, CT (US)

(72) Inventors: Amit Keshri, Telangana (IN); Appalaraju Marpu, Telangana (IN)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 16/432,090

(22) Filed: Jun. 5, 2019

(65) Prior Publication Data
US 2019/0377567 A1    Dec. 12, 2019

(30) Foreign Application Priority Data

Jun. 6, 2018   (IN) .............................. 201811021167

(51) Int. Cl.
| | | |
|---|---|---|
| *G06F 8/65* | (2018.01) | |
| *G06N 20/00* | (2019.01) | |
| *B66B 1/34* | (2006.01) | |
| *B66B 25/00* | (2006.01) | |
| *H04L 29/08* | (2006.01) | |

(52) U.S. Cl.
CPC .............. *G06F 8/65* (2013.01); *B66B 1/3453* (2013.01); *B66B 25/003* (2013.01); *G06N 20/00* (2019.01); *H04L 67/34* (2013.01)

(58) Field of Classification Search
CPC ..... H04W 4/70; H04W 68/00; H04W 72/042; H04W 68/005; H04W 76/27; H04W 36/0055; H04W 36/14; B66B 5/0025; B66B 1/2458; B66B 1/3461; B66B 1/468; B66B 2201/4653
See application file for complete search history.

(56) References Cited

U.S. PATENT DOCUMENTS

| | | |
|---|---|---|
| 4,568,909 A | 2/1986 | Whynacht |
| 5,168,136 A | 12/1992 | Thangavelu et al. |
| (Continued) | | |

FOREIGN PATENT DOCUMENTS

| | | |
|---|---|---|
| CN | 103466397 A | 12/2013 |
| CN | 103677946 A | 3/2014 |
| (Continued) | | |

OTHER PUBLICATIONS

European Search Report for application EP 19178814.0, dated Oct. 7, 2019, 6 pages.

*Primary Examiner* — Michael A Keller
*Assistant Examiner* — Thao D Duong
(74) *Attorney, Agent, or Firm* — Cantor Colburn LLP

(57) ABSTRACT

A method for automatically updating software of a computing device of a transportation device is provided herein. The method includes performing, by a server device, machine learning on run count performance data of the transportation device to determine a next idle time. The method includes publishing, by the server device, software availability information to the computing device of the transportation device with the next idle time. The method includes causing, by the server device, an automatic upgrade of the software of the computing device of the transportation device at the next idle time.

2 Claims, 3 Drawing Sheets

(56) References Cited

U.S. PATENT DOCUMENTS

| | | | |
|---|---|---|---|
| 7,006,820 B1 * | 2/2006 | Parker | H04M 3/247 |
| | | | 455/414.1 |
| 2008/0148268 A1 | 6/2008 | Hirouchi | |
| 2016/0171455 A1 | 6/2016 | Eleid et al. | |
| 2017/0210596 A1 * | 7/2017 | Mezzadri | H02J 7/0021 |
| 2017/0272316 A1 | 9/2017 | Johnson et al. | |
| 2017/0369275 A1 * | 12/2017 | Saraswat | H05B 1/0227 |

FOREIGN PATENT DOCUMENTS

| | | |
|---|---|---|
| CN | 204999449 U | 1/2016 |
| CN | 105819290 B | 12/2017 |
| CN | 107643901 A | 1/2018 |
| JP | 2006056677 A | 3/2006 |
| JP | 5346906 B2 | 11/2013 |
| JP | 5996703 B1 | 9/2016 |
| WO | 2016180484 A1 | 11/2016 |

\* cited by examiner

AUTOMATIC UPGRADE ON TOTAL RUN COUNT DATA ON AVAILABILITY OF NEW SOFTWARE

FOREIGN PRIORITY

This application claims priority to Indian Patent Application No. 201811021167, filed Jun. 6, 2018, and all the benefits accruing therefrom under 35 U.S.C. § 119, the contents of which in its entirety are herein incorporated by reference.

BACKGROUND

In general, conventional elevator systems observe that in multiple scenarios a user is unaware of an idle time of an elevator of the conventional elevator systems. Further, due to this lack of awareness, the user will arbitrarily attempt to upgrade software of the conventional elevator systems in real time. However, software upgrade impact a functioning of the elevator when the elevator is in a running mode rather than idle.

BRIEF DESCRIPTION

In accordance with one or more embodiments, a method for automatically updating software of a computing device of a transportation device is provided herein. The method includes performing, by a server device, machine learning on run count performance data of the transportation device to determine a next idle time. The method includes publishing, by the server device, software availability information to the computing device of the transportation device with the next idle time. The method includes causing, by the server device, an automatic upgrade of the software of the computing device of the transportation device at the next idle time.

In accordance with one or more embodiments and the method embodiment above, the method can include sending, by the server device, the software availability information to a distribution service to retrieve the run count performance data.

In accordance with one or more embodiments and the any of the method embodiments above, the run count performance data can be stored in the distribution service on one or more servers or databases accessible by the server device.

In accordance with one or more embodiments and the any of the method embodiments above, the run count performance data can include a count of every time the transportation device operates and a time stamp associated with each count instance.

In accordance with one or more embodiments and the any of the method embodiments above, determining the next idle time can include determining a total run count over a time period and when a count or an average count per day is equal to or less than a threshold as the next idle time.

In accordance with one or more embodiments and the any of the method embodiments above, the method can include publishing the software availability information to a plurality of computing devices through a distribution service.

In accordance with one or more embodiments and the any of the method embodiments above, the transportation device can include an elevator or an escalator.

In accordance with one or more embodiments, a system for automatically updating software of a computing device of a transportation device is provided. The system includes the computing device of the transportation device. The system includes a server device performing machine learning on run count performance data of the transportation device to determine a next idle time, publishing software availability information to the computing device of the transportation device with the next idle time, and causing an automatic upgrade of the software of the computing device of the transportation device at the next idle time.

In accordance with one or more embodiments and the system embodiment above, the server device can send the software availability information to a distribution service to retrieve the run count performance data.

In accordance with one or more embodiments and the any of the system embodiments above, the run count performance data can be stored in the distribution service on one or more servers or databases accessible by the server device.

In accordance with one or more embodiments and the any of the system embodiments above, the run count performance data can include a count of every time the transportation device operates and a time stamp associated with each count instance.

In accordance with one or more embodiments and the any of the system embodiments above, the server device can determine the next idle time by determining a total run count over a time period and when a count or an average count per day is equal to or less than a threshold as the next idle time.

In accordance with one or more embodiments and the any of the system embodiments above, the server device can publish the software availability information to a plurality of computing devices through a distribution service.

In accordance with one or more embodiments and the any of the system embodiments above, the transportation device can include an elevator or an escalator.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

In general, one or more embodiments include a system utilizing machine learning on run count performance data to determine idle time for elevators and executing an automatic upgrade of software for computing devices of the elevators during the idle time. Further, the system can also schedule other types of elevator services during the idle time. The technical effect and benefits of the one or more embodiments include predicting actual idle time of the elevators based on machine learning of previous accumulated performance run count data; automatically scheduling the upgrade of software for computing devices of the elevators without any manual intervention; minimalizing or eliminating down time of the elevators due to the upgrade as the elevators are idle; and minimalizing a load on the system as the automatic software upgrade is directly tied to idle time availability.

Figure 1:
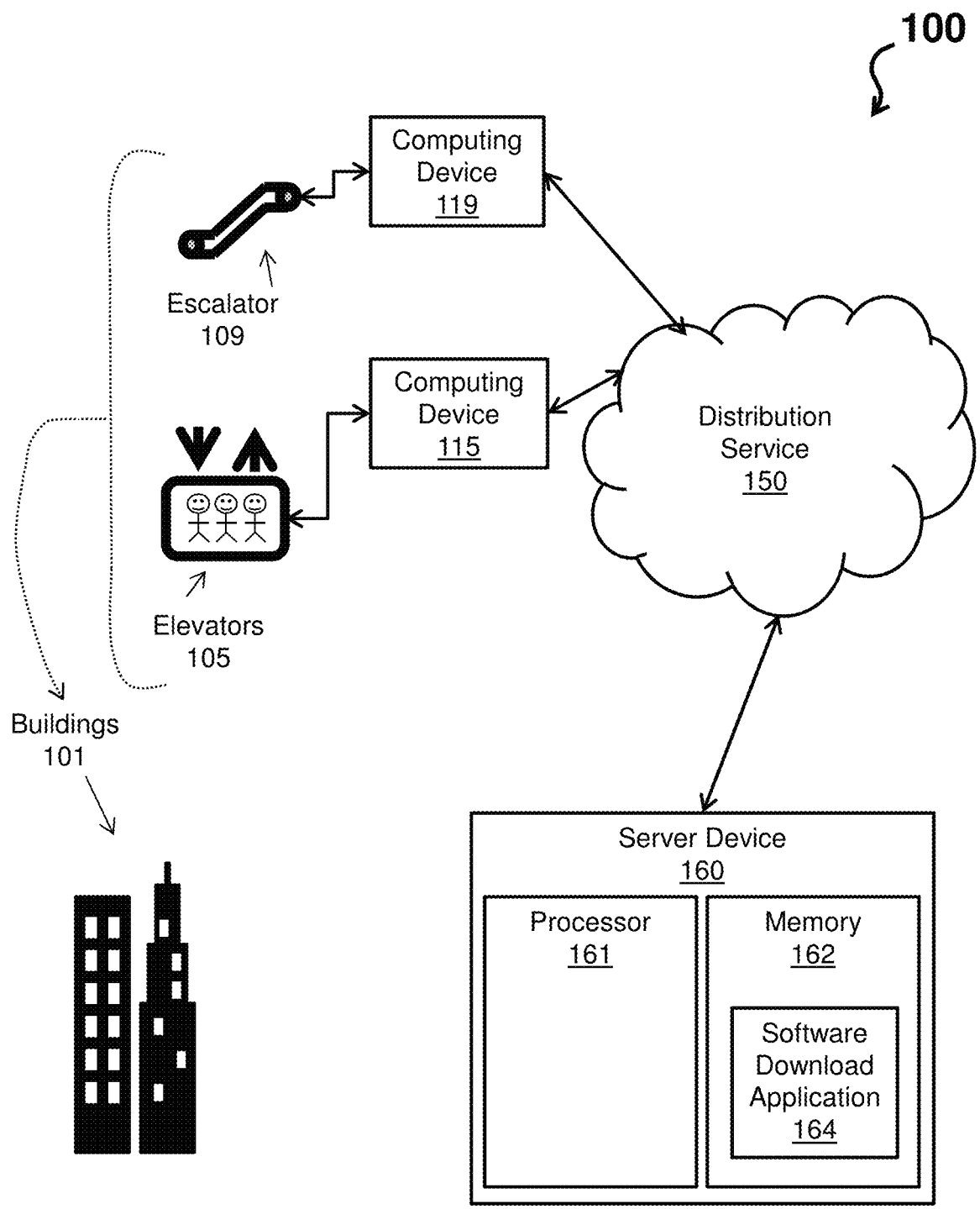
FIG. 1 depicts an architecture in accordance with one or more embodiments.

Turning now to FIG. 1, an architecture 100 is depicted in accordance with one or more embodiments. The architecture 100 comprises one or more buildings 101. The one or more buildings 101 can be any building or facility comprising one or more transportation devices, such as one or more elevators 105 and one or more escalators 109. Examples of the one or more buildings 101 include, but are not limited to, high-rise buildings, sky-scrapers, shopping malls, stadiums, convention centers, train stations, and airports. Each of the one or more elevators 105 and one or more escalators 109 can be controlled by at least one computing device 115 and 119 with a processor and a memory, such as a common platform interface boards (CPIBs), controllers, and/or elevator sub-systems. Note that the common platform interface boards (CPIBs), controllers, and/or elevator sub-systems comprise software that operates and manages the one or more elevators 105 and the one or more escalators 109, respectively.

The architecture 100 comprises a distribution service 150 communicatively coupled to the one or more elevators 105 and one or more escalators 109 (e.g., the at least one computing device 115 and 119). The distribution service 150 is also communicatively coupled to a server device 160 comprising at least a processor 161 and a memory 162.

The distribution service 150 and the server device 160 can be any computing platform and/or device comprising one or more central processing units (e.g., the processor 161). In accordance with one or more embodiments, the distribution service is a cloud computing environment providing one or more of software as a service, infrastructure as a service, and platform as a service. The one or more central processing units, also referred to as a processing circuit, are coupled via a system bus to a system memory (e.g., the memory 162) and various other components. The system memory can include a read only memory (ROM) and a random access memory (RAM). The ROM is coupled to the system bus and may include a basic input/output system (BIOS), which controls certain basic functions of the distribution service 150 and the server device 160. The RAM is read-write memory coupled to the system bus for use by the one or more central processing units.

In accordance with one or more embodiments, the system memory is an example of a tangible storage medium readable by the one or more central processing units. The system memory can store software (e.g., a software download application 164) as instructions for execution by the one or more central processing units to cause the distribution service 150 and the server device 160 to operate, such as is described herein with reference to FIGS. 2-3. The distribution service 150 and the server device 160 can communicate internally and/or with any external system through wired or wireless connections utilizing any communication protocol.

Figure 2:
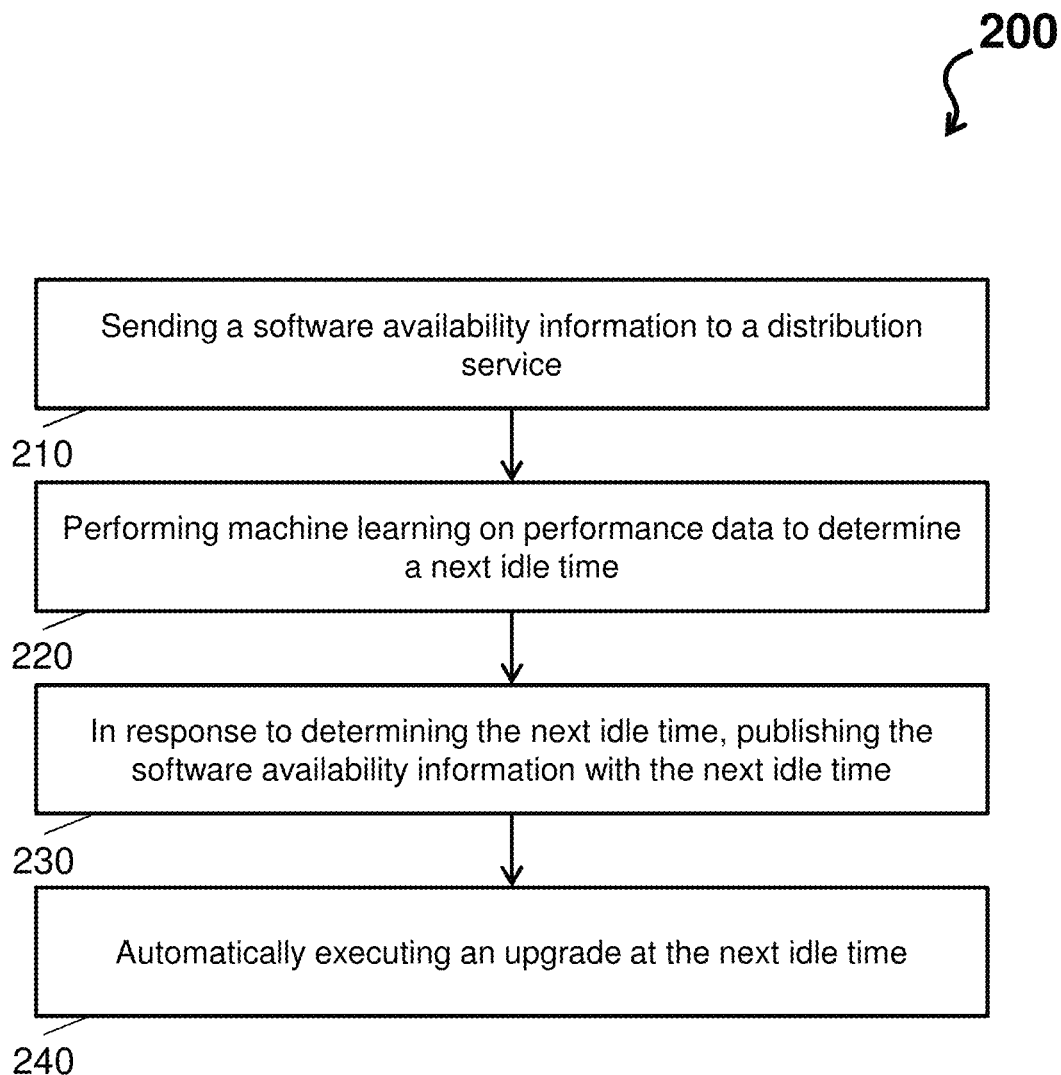
FIG. 2 depicts a process flow of an architecture in accordance with one or more embodiments.

Turning now to FIG. 2, a process flow 200 of the architecture 100 is depicted in accordance with one or more embodiments. The process flow 200 is an example of performing machine learning on run count performance data of the one or more elevators 105 (referred herein as the elevator 105) and one or more escalators 109 (referred herein as the escalators 109) to determine idle time. The process flow 200 begins at block 210, where the server device 160 sends software availability information to the distribution service 150.

At block 220, the architecture 100 performs machine learning on run count performance data of the elevator 105 and/or the escalator 109 to determine a next idle time for each. The distribution service 150 or the server device 160 can execute this determination of the next idle time. The run count performance data can be stored in the distribution service 150, on servers and/or databases accessible by the server device 160. The run count performance data can include a count of every time the elevator 105 and/or the escalator 109 operates (moves in any direction) and a time stamp associated with each count instance. In this way, the architecture 100 determines a total run count over a time period and further determines when a count or an average count per day is equal to or less than a threshold. For example, the elevator 105 an average count per day over a certain portion of the time period is equal to or less than five, which means the elevator 105 was in use five time during that portion. An average count that is equal to or less than five indicates an idle time.

At block 230, the architecture 100 publishes software availability information to the at least one computing device 115 and 119 with the next idle time. In accordance with one or more embodiments, after determining respective idle times of the elevator 105 and the escalator 109, a same version is published to the at least one computing device 115 and 119 with respective future idle times, during with the upgrade is performed. In accordance with one or more embodiments with respect to grouped elevators, all elevators can be upgraded at a same idle time or sequentially during the next idle time of the grouped elevators.

At block 240, the architecture 100 automatically executes an upgrade at the next idle time. For example, the distribution service 150 or the server device 160 can cause an automatic upgrade of the software of the computing device 115 (e.g., the common platform interface board) of the elevator 115 at the next idle time. The computing device 115 at the received next idle time can also automatically request the software upgrade from the distribution service 150 or the server device 160.

Figure 3:
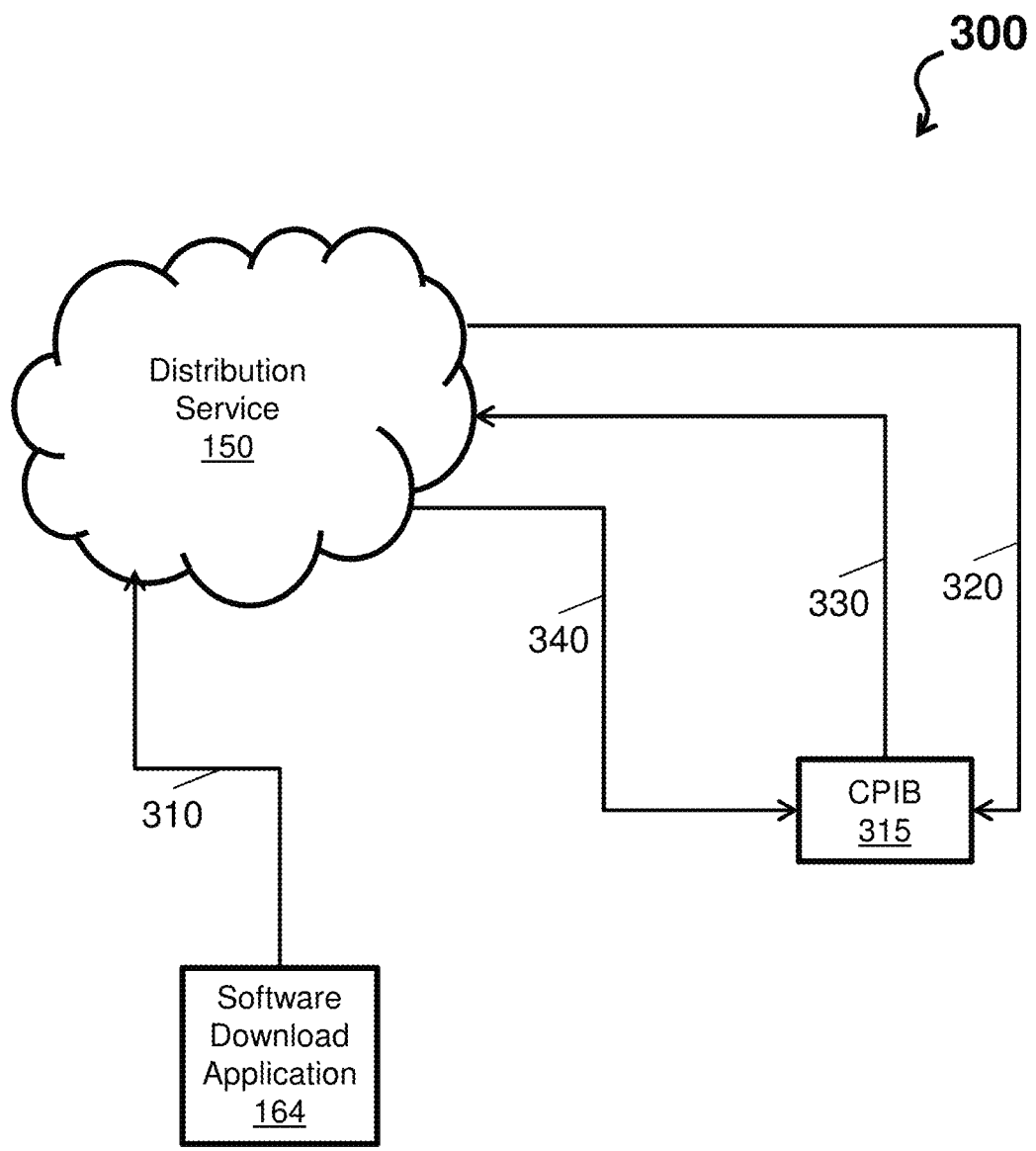
FIG. 3 depicts a schematic flow of an architecture in accordance with one or more embodiments.

Turning now to FIG. 3, a schematic flow 300 of the architecture 100 is depicted in accordance with one or more embodiments. In the schematic flow 300, as indicated by arrow 310, the software download application 164 sends new software to the distribution system 150. Then, as indicated by arrow 320, the common platform interface board (CPIB) 315 sends a request for a firmware upgrade at a future idle time to the distribution system 150. Next, as indicated by arrow 330, the distribution system 150 sends a next idle time to the common platform interface board 315. Then, as indicated by arrow 340, the distribution system 150 pushes the new software at the next idle time to the common platform interface board 315.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method for automatically updating software of a computing device of an elevator or escalator, the method comprising:
   performing, by a server device, machine learning on run count performance data of the elevator or escalator to determine a next idle time;
   publishing, by the server device, software availability information to the computing device of the elevator or escalator with the next idle time; and
   causing, by the server device, an automatic upgrade of the software of the computing device of the elevator or escalator at the next idle time;
   wherein determining the next idle time includes determining a total run count over a time period and when an average count per day is equal to or less than a threshold as the next idle time.

2. The method of claim 1 wherein the computing device controls a plurality of grouped elevators, the automatic upgrade of the software of the computing device occurring during an idle time of the plurality of grouped elevators.

* * * * *